(12) United States Patent
Meftah et al.

(10) Patent No.: US 9,411,723 B2
(45) Date of Patent: Aug. 9, 2016

(54) DATA EXCHANGE SYSTEM

(71) Applicant: SCHNEIDER ELECTRIC INDUSTRIES SAS, Rueil-Malmaison (FR)

(72) Inventors: Tewfik Meftah, Grenoble (FR); Romain Gassion, Izeaux (FR); Thierry Chiche, St Ismier (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 63 days.

(21) Appl. No.: 14/389,903

(22) PCT Filed: Apr. 19, 2013

(86) PCT No.: PCT/EP2013/058162
§ 371 (c)(1),
(2) Date: Oct. 1, 2014

(87) PCT Pub. No.: WO2013/174586
PCT Pub. Date: Nov. 28, 2013

(65) Prior Publication Data
US 2015/0293839 A1  Oct. 15, 2015

(30) Foreign Application Priority Data
May 21, 2012 (FR) .................... 12 54621

(51) Int. Cl.
G06F 12/00    (2006.01)
G06F 12/02    (2006.01)
G06K 19/07    (2006.01)
G06K 19/073   (2006.01)
G06F 1/32     (2006.01)

(52) U.S. Cl.
CPC .......... *G06F 12/0246* (2013.01); *G06F 1/3296* (2013.01); *G06K 19/0701* (2013.01); *G06K 19/07345* (2013.01); *G06F 2212/7201* (2013.01)

(58) Field of Classification Search
None
See application file for complete search history.

(56) References Cited

U.S. PATENT DOCUMENTS

| 5,864,580 A | 1/1999 | Lowe et al. |
| 2007/0106765 A1 | 5/2007 | Erickson et al. |
| 2008/0055090 A1 | 3/2008 | Erickson et al. |

(Continued)

FOREIGN PATENT DOCUMENTS

| EP | 0 827 100 | 3/1998 |
| FR | 2 810 766 | 12/2001 |

OTHER PUBLICATIONS

U.S. Appl. No. 14/416,352, filed Jan. 22, 2015, Gassion, et al.

(Continued)

*Primary Examiner* — Kevin Verbrugge
*Assistant Examiner* — Craig Goldschmidt
(74) *Attorney, Agent, or Firm* — Oblon, McClelland, Maier & Neustadt, L.L.P.

(57) ABSTRACT

A data exchange system including: a microprocessor; a non-volatile memory; a first communication channel linking the microprocessor to the non-volatile memory; a first supply channel configured to supply electrical energy to the microprocessor and to the non-volatile memory; a control device; a second communication channel through which an external device can exchange data with the non-volatile memory; a second supply channel configured to supply the control device and the non-volatile memory.

14 Claims, 1 Drawing Sheet

(56) References Cited

U.S. PATENT DOCUMENTS

2008/0284603 A1    11/2008   Erikson et al.
2012/0197798 A1*   8/2012   Grigg ................ G06Q 20/1085
                                                           705/43

OTHER PUBLICATIONS

International Search Report issued Jun. 12, 2013 in PCT/EP13/058162 filed Apr. 19, 2013.

* cited by examiner

DATA EXCHANGE SYSTEM

TECHNICAL FIELD OF THE INVENTION

The present invention relates to a data interchange system.

PRIOR ART

The patent application EP1571511A2 discloses a solution for externally accessing a memory situated inside a unit. This solution involves supplying power to the memory by virtue of an external device that can be connected to said memory by a wireless link.

This solution from the prior art is not satisfactory because it cannot guarantee safe communication, without perturbation, between the microprocessor and the memory when the external device is present within range of the unit.

The aim of the invention is to propose a data interchange system that allows external access to a memory of a unit while guaranteeing safe data interchange between the electronic circuits and said memory, even when the external device is nearby.

DISCLOSURE OF THE INVENTION

This aim is achieved by a data interchange system having a microprocessor, a nonvolatile memory, a first communication channel connecting the microprocessor to the nonvolatile memory and a first power supply channel designed to supply electric power to the microprocessor and the nonvolatile memory. The system likewise has:

a control device, a second communication channel, through which an external device can interchange data with the nonvolatile memory, a second power supply channel designed to supply power to the control device and the nonvolatile memory.

The control device exhibits the following features:

means for detecting the electric power in the first power supply channel, means for selecting between the first power supply channel and the second power supply channel, the first power supply channel being activated when electric power is detected in the first power supply channel by the detection means, the second power supply channel being activatable when no electric power is detected in the first power supply channel by the detection means, means for controlling the second communication channel, the second communication channel being activated when the external device is present and the second power supply channel is activatable, in order to allow the interchange of data between the external device and the nonvolatile memory.

According to one special feature, the control device has a microcontroller and a communication interface, said communication interface managing the interchange of data through the second communication channel.

According to another special feature, the communication interface is designed to communicate with the external device by means of a near-field technology.

According to another special feature, the first communication channel is in the form of a communication bus, for example of I2C type.

According to another special feature, the control means have a first switching element designed to provide DC isolation between the control device and the first communication channel when the second communication channel is deactivated.

According to another special feature, the control means have a second switching element designed to provide DC isolation between the control device and the first power supply channel when the second power supply channel is deactivated.

BRIEF DESCRIPTION OF THE FIGURES

Other features and advantages will become apparent in the detailed description that follows with reference to the appended drawings, in which.

DETAILED DESCRIPTION OF AT LEAST ONE EMBODIMENT

Figure 1:
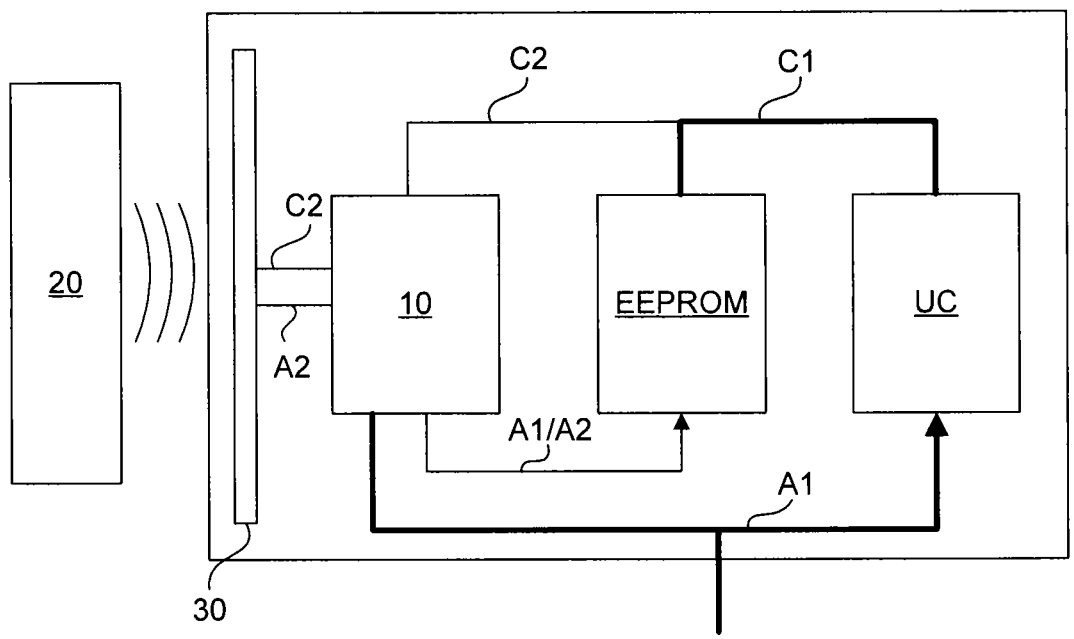
FIG. 1 schematically shows the data interchange system of the invention.

With reference to FIG. 1, the data interchange system has a microprocessor UC and a nonvolatile memory (referenced EEPROM), for example of EEPROM type. It likewise has a first communication channel C1, through which the microprocessor UC can access the nonvolatile memory EEPROM in order to read and/or write data therefrom/thereto. By way of example, this first communication channel C1 is in the form of a communication bus, such as an I2C ("Inter-integrated circuit") bus.

The system has a first power supply channel A1 designed to supply electric power to the microprocessor UC and the nonvolatile memory EEPROM. By way of example, this first power supply channel A1 is connected to a power source that is external to the system (and is not shown).

The system likewise has a control device 10 allowing management of the communication and supply of power between an external device 20 wishing to access the nonvolatile memory EEPROM from outside the system and the electronic components that are internal to the system, that is to say the microprocessor UC and the nonvolatile memory EEPROM.

The system has a second communication channel C2 through which the device 10 that is external to the system can interchange data with the nonvolatile memory EEPROM. The second communication channel C2 is connected to the communication bus.

The system has a second power supply channel A2 designed to supply electric power to the control device 10 and the nonvolatile memory EEPROM.

Figure 2:
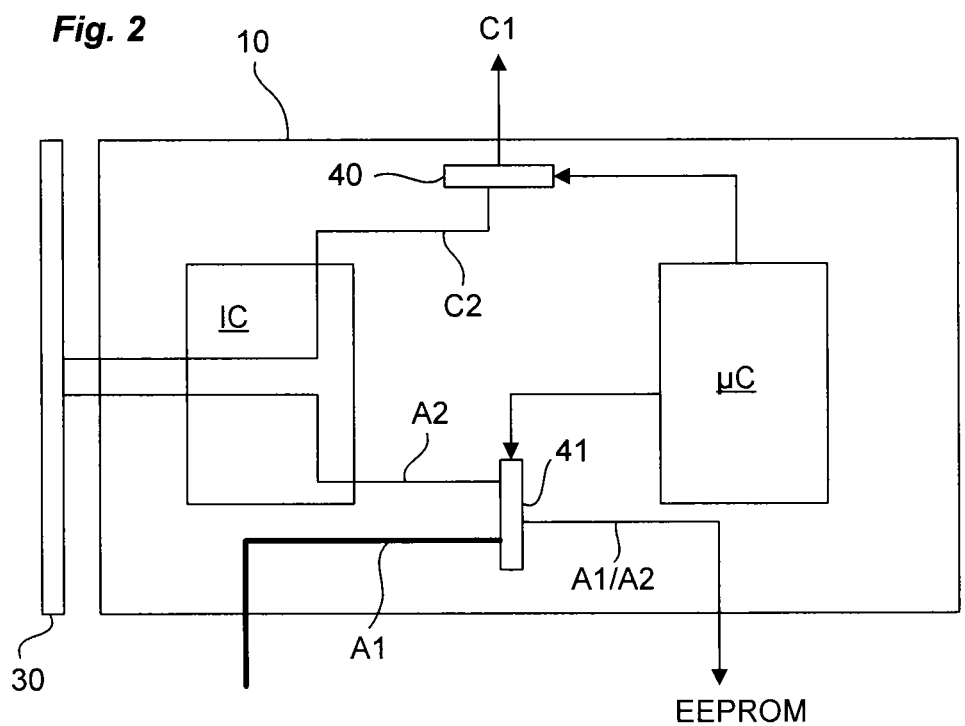
FIG. 2 schematically shows the control device used in the data interchange system of the invention.

With reference to FIG. 2, the control device 10 has a microcontroller µC and a communication interface IC. The microcontroller µC has control means allowing control of the second communication channel C2 and means for selecting between the first power supply channel A1 and the second power supply channel A2.

According to the invention, the communication interface IC is responsible for managing the interchange of the data between the external device 20 and the nonvolatile memory EEPROM when the second communication channel C2 is activated. This communication interface IC allows communication firstly with the external device 20, by means of a first communication protocol and secondly with the nonvolatile memory EEPROM, by means of a second communication protocol.

According to the invention, the first protocol is implemented through a wireless near field technology (NFC for "near field communication"), for example. The communication interface IC is thus connected to an antenna 30. This technology therefore allows the external device 20 to communicate via the second communication channel C2 and likewise to supply power to the control device 10 and the nonvolatile memory EEPROM via the second power supply channel A2. Preferably, the near field technology used is RFID (for "radiofrequency identification").

According to the invention, the second communication protocol used on the communication bus between the control device 10 and the EEPROM is of master/slave type.

In an exemplary embodiment, the first power supply channel A1 is connected directly to the microprocessor UC and is connected to the nonvolatile memory EEPROM via the control device 10. The second power supply channel A2 is connected to the antenna 30 and to the non-volatile memory EEPROM via the control device 10.

The first power supply channel A1 and the second power supply channel A2 are thus connected to the control device 10 in parallel. As long as electric power is detected in the first power supply channel A1, the selection means keep the first power supply channel activated and the second power supply channel A2 deactivated, even if an external device is present. The communication between the microprocessor UC and the nonvolatile memory EEPROM through the first communication channel C1 is therefore not perturbated, even in the presence of the external device 20 within range of the antenna 30. When no electric power is passing through the first power supply channel A1 and when the external device 20 is present, the selection means activate the second power supply channel A2 and the control means activate the second communication channel C2. Thus, the external device 20 can interchange data with the nonvolatile memory EEPROM through the second communication channel C2.

In order to ensure safe communication, the control device has at least two switching elements 40, 41 that allow the second communication channel C2, the first power supply channel A1 and the second power supply channel A2 to be activated or deactivated. When the second communication channel C2 is deactivated, the first switching element 40 is designed to provide DC isolation between the control device 10 and the communication bus. When the second power supply channel A2 is deactivated, the second switching element 41 is designed to provide DC isolation between the control device 10 and the first power supply channel A1. Thus, it is possible to guarantee safe data interchange, without perturbation, between the microprocessor UC and the nonvolatile memory EEPROM.

When electric power passes through the first power supply channel A1, the control device 10 then has DC isolation from the communication bus and from the power source connected to the first power supply channel A1.

If no electric power is detected in the first power supply channel A1 and if the external device 20 is present within range of the antenna 30, the control device 10 is connected to the communication bus, by activating the second communication channel C2.

The detection of electric power in the first power supply channel A1 can be implemented by any appropriate means. By way of example, voltage measurement may be involved.

According to a variant embodiment of the invention, the switching elements can be actuated manually rather than by the microcontroller 11C of the control device 10, for example.

The system of the invention thus allows a nonvolatile memory to be accessed from outside a unit, without perturbing the normal operation of said unit. The system allows a large quantity of data to be interchanged while taking account of interruptions owing to electric power failures and communication losses. It allows safe operation to be guaranteed, whatever the situation, and can easily be fitted to an existing unit. The interchanged data are linked to software updates or to operating parameters for an application, for example.

The invention claimed is:

1. A data interchange system comprising:
   a microprocessor;
   a nonvolatile memory;
   a first communication channel connecting the microprocessor to the nonvolatile memory;
   a first power supply channel configured to supply electric power to the microprocessor and the nonvolatile memory;
   a control device;
   a second communication channel, through which an external device can interchange data with the nonvolatile memory; and
   a second power supply channel configured to supply power to the control device and the nonvolatile memory, and not the microprocessor, wherein
   the control device includes
      means for detecting the electric power in the first power supply channel,
      means for selecting between the first power supply channel and the second power supply channel, the first power supply channel being activated when electric power is detected in the first power supply channel by the means for detecting, the second power supply channel being activated when no electric power is detected in the first power supply channel by the means for detecting,
      means for controlling the second communication channel, the second communication channel being activated when the external device is present and the second power supply channel is activated, to allow interchange of data between the external device and the nonvolatile memory, and
      means for controlling the first communication channel, the first communication channel being activated when the first power supply channel is activated, to disallow interchange of data between the external device and the nonvolatile memory.

2. The system as claimed in claim 1, wherein the control device comprises a microcontroller and a communication interface, the communication interface managing interchange of data through the second communication channel.

3. The system as claimed in claim 2, wherein the communication interface is configured to communicate with the external device by a near-field technology.

4. The system as claimed in claim 1, wherein the first communication channel is in a form of a communication bus.

5. The system as claimed in claim 4, wherein the communication bus is of inter-integrated circuit (I2C) type.

6. The system as claimed in claim 1, wherein the means for controlling comprises a first switching element configured to provide direct current (DC) isolation between the control device and the first communication channel when the second communication channel is deactivated.

7. The system as claimed in claim 6, wherein the means for controlling comprises a second switching element configured to provide DC isolation between the control device and the first power supply channel when the second power supply channel is deactivated.

8. A data interchange system comprising:
a microprocessor;
a nonvolatile memory;
a first communication channel connecting the microprocessor to the nonvolatile memory;
a first power supply channel configured to supply electric power to the microprocessor and the nonvolatile memory;
a control device;
a second communication channel, through which an external device can interchange data with the nonvolatile memory; and
a second power supply channel configured to supply power to the control device and the nonvolatile memory, and not the microprocessor, wherein
the control device includes circuitry configured to
detect the electric power in the first power supply channel,
select between the first power supply channel and the second power supply channel, the first power supply channel being activated when electric power is detected in the first power supply channel, the second power supply channel being activated when no electric power is detected in the first power supply channel,
control the second communication channel, the second communication channel being activated when the external device is present and the second power supply channel is activated, to allow interchange of data between the external device and the nonvolatile memory, and
control the first communication channel, the first communication channel being activated when the first power supply channel is activated, to disallow interchange of data between the external device and the nonvolatile memory.

9. The system as claimed in claim 8, wherein the control device comprises a communication interface, the communication interface managing interchange of data through the second communication channel.

10. The system as claimed in claim 9, wherein the communication interface is configured to communicate with the external device by a near-field technology.

11. The system as claimed in claim 8, wherein the first communication channel is in a form of a communication bus.

12. The system as claimed in claim 11, wherein the communication bus is of inter-integrated circuit (I2C) type.

13. The system as claimed in claim 8, wherein the control device comprises a first switch configured to provide direct current (DC) isolation between the control device and the first communication channel when the second communication channel is deactivated.

14. The system as claimed in claim 13, wherein the control device comprises a second switch configured to provide DC isolation between the control device and the first power supply channel when the second power supply channel is deactivated.

* * * * *